(12) United States Patent
Müller et al.

(10) Patent No.: US 9,714,823 B2
(45) Date of Patent: Jul. 25, 2017

(54) SEPARATION MEASUREMENT METHOD AND SEPARATION MEASUREMENT DEVICE

(71) Applicant: SIEMENS AKTIENGESELLSCHAFT, München (DE)

(72) Inventors: Andreas Müller, Berlin (DE); Peter Polesky, Velten (DE); Katrin Tritsch, Deutschland (DE); Rolf-Dieter Woitscheck, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/737,684

(22) Filed: Jun. 12, 2015

(65) Prior Publication Data

US 2015/0377610 A1     Dec. 31, 2015

(30) Foreign Application Priority Data

Jun. 27, 2014    (DE) ........................ 10 2014 212 412

(51) Int. Cl.
*G01N 21/00*     (2006.01)
*G01B 11/14*     (2006.01)
(Continued)

(52) U.S. Cl.
CPC ............ *G01B 11/14* (2013.01); *F01D 11/14* (2013.01); *F01D 21/003* (2013.01); *G01B 17/00* (2013.01)

(58) Field of Classification Search
CPC . G01B 7/285; G01B 7/14; G01B 7/02; G01B 11/14; G01B 11/26; G01B 21/16;
(Continued)

(56) References Cited

U.S. PATENT DOCUMENTS 4,907,456 A     3/1990  Rozelle
5,140,494 A *   8/1992  Slade ...................... G01B 7/14
                                                            324/660
(Continued)

FOREIGN PATENT DOCUMENTS

DE       102010053726 A1     5/2012
EP           2278268 A2      1/2011
(Continued)

OTHER PUBLICATIONS

German Search Report and Opinion dated Mar. 3, 2015 in corresponding German Patent Application No. 10 2014 212 412.3 (8 total pages).

(Continued)

*Primary Examiner* — Hoa Pham
(74) *Attorney, Agent, or Firm* — Ostrolenk Faber LLP (57) ABSTRACT

A method for measuring a separation (a) between blade tips of rotor blades (40) on a rotor and a casing (41) annularly surrounding the rotor blade tips, when the rotor is rotating: measuring separation using at least one separation measurement device (1) which measures in contactless fashion. A separation measurement device for carrying this method includes a tubular housing (2), a separation sensor which measures in contactless fashion and which is accommodated in the housing (2) such that the sensor moves axially between an operating position, wherein a tip of the sensor projects outward from the separation measurement device (1), and a withdrawn position, wherein the tip of the separation sensor (7) is arranged within the separation measurement device (1); and an arresting device (8) which arrests the separation sensor (7) at least in its operating position.

11 Claims, 5 Drawing Sheets

(51) Int. Cl.
  *F01D 11/14* (2006.01)
  *F01D 21/00* (2006.01)
  *G01B 17/00* (2006.01)

(58) Field of Classification Search
  CPC ..... F01D 11/14; F01D 21/003; G01N 21/954; G01N 2021/9544
  USPC .......................... 356/614–623, 241.1, 241.3
  See application file for complete search history.

(56) References Cited

U.S. PATENT DOCUMENTS

| | | | |
|---|---|---|---|
| 5,166,626 A * | 11/1992 | Hester | G01B 7/14 324/683 |
| 8,427,644 B2 | 4/2013 | Miki | |
| 8,641,604 B2 * | 2/2014 | Golden | A61B 1/0052 600/101 |
| 9,116,071 B2 * | 8/2015 | Hatcher, Jr. | G02B 23/2484 |
| 2003/0222640 A1 | 12/2003 | Twerdochlib et al. | |
| 2006/0291059 A1 | 12/2006 | Heyworth | |
| 2008/0218181 A1 * | 9/2008 | Ducheminsky | G01B 7/14 324/662 |
| 2009/0071256 A1 | 3/2009 | Ichiryu | |
| 2010/0213929 A1 * | 8/2010 | Gregg | F01D 11/20 324/207.15 |
| 2011/0286006 A1 * | 11/2011 | Xie | G01B 11/0608 356/609 |
| 2012/0314200 A1 * | 12/2012 | Eyal | G01C 3/08 356/4.06 |
| 2013/0278939 A1 | 10/2013 | Pfister et al. | |
| 2015/0090017 A1 * | 4/2015 | Silieti | G01M 15/02 73/112.01 |
| 2015/0097582 A1 * | 4/2015 | Szedlacsek | G01B 7/14 324/662 |
| 2015/0300920 A1 * | 10/2015 | DeAscanis | G01M 15/14 356/614 |
| 2016/0011075 A1 * | 1/2016 | Maluck | G01J 3/28 356/125 |

FOREIGN PATENT DOCUMENTS

| | | |
|---|---|---|
| GB | 2 427 683 A | 1/2007 |
| JP | 2003-042745 A | 2/2003 |

OTHER PUBLICATIONS

European Search Report and Opinion dated Nov. 17, 2015 in corresponding European Patent Application No. 15166676.5 (8 total pages).

Takeshi Tagashira, et al., "Measurement of Blade Tip Clearance Using an Ultrasonic Sensor," American Institute of Aeronautics and Astronautics, Inc., AP9715249, AIAA Paper 97-0165, Aerospace Sciences Meeting & Exhibit, 35th, Reno, NV, Jan. 6-9, 1997 (9 total pages).

David Kwapisz, et al., "Application of Microwave Sensing to Blade Health Monitoring," European Conference of the Prognostics and Health Management Society, Dresden 2012, pp. 17-24.

* cited by examiner

SEPARATION MEASUREMENT METHOD AND SEPARATION MEASUREMENT DEVICE

CROSS-REFERENCE TO RELATED APPLICATIONS

The present application claims priority of German Patent Application No. 102014212412.3, filed Jun. 27, 2014, the contents of which are incorporated by reference herein.

TECHNICAL FIELD

The present invention relates to a method for measuring a separation between blade tips of rotor blades held on a rotor and a casing surrounding the rotor blade tips in annular fashion, when the rotor is rotating. The present invention further relates to a separation measurement device which is in particular suitable for carrying out such a measurement method.

TECHNICAL BACKGROUND

In order to ensure proper operation of a turbine, it is important to set a predefined separation or a predefined annular gap width between the blade tips of the rotor blades and a casing which surrounds the blade tips and which is for example formed by guide vane supports. Such a setting is carried out on an already-assembled turbine, prior to initial startup, as well as before and after carrying out maintenance work.

In a first step, the actual separation between the blade tips and the guide vane supports is measured while the rotor is rotating. To that end, use is made for example of a measurement method in which a metal pin is inserted through a radial through opening provided in the casing until the installer observes contact between the rotor blade tips and the metal pin. The depth of insertion of the metal pin then makes it possible to determine the actual separation present between the blade tips and the casing. Based on the determined actual separation, a further step involves adjusting the relative position of the components. However, one problem of such a separation measurement lies in the fact that it can cause damage to the turbine. If the metal pin is pushed too far into the through opening of the casing, it can be sheared off by the rotating rotor blades and fall into the machine. The consequence of this is that the already fully-assembled turbine has to once again be largely dismantled in order to remove the lost parts from the turbine, which is associated with very high costs.

SUMMARY OF THE INVENTION

Proceeding from this prior art, the present invention has the object of providing a method for measuring a separation between blade tips of rotor blades held on a rotor and a casing surrounding the rotor blade tips in annular fashion, when the rotor is rotating, which method can be carried out simply and cost-effectively and does not bring with it the risk of damage. The present invention has the further object of providing a measurement device which is in particular suitable for carrying out such a measurement method.

In order to achieve this object, the present invention provides a method of the type mentioned in the introduction, which is characterized in that the separation is measured using at least one separation measurement device having a separation sensor which measures in contactless fashion. By virtue of the fact that the separation sensor operates in contactless fashion, it cannot be damaged by the rotor blades which rotate during the measurement, with the result that intensive and expensive additional work of the type mentioned in the introduction can be avoided.

Preferably, the separation measurement device has a confocal chromatic separation sensor. The use of a confocal chromatic separation sensor is advantageous in that it returns very precise measurement results.

According to one embodiment of the method according to the invention, the separation measurement device for carrying out the separation measurement is inserted into a through bore which extends radially through the casing and is accessible from outside. Accordingly, the separation measurement device is simple to install and remove.

Preferably, the separation measurement is carried out at multiple circumferential positions which are in particular evenly spaced apart from one another. This ensures proper detection of the relative actual position of the rotor and the casing, which in turn permits proper orientation of the relative position.

The separation measurement device and the through bore(s) are advantageously formed such that it is ensured that, in the normal state, the casing extends radially further inward than the separation measurement device accommodated in a through bore. Thus, for example the through bore(s) and the outer contour of the measurement device can be provided with respective shoulders which prevent the separation measurement device from projecting radially inward with respect to the casing. This makes it possible to reliably prevent the separation measurement device from coming into contact with the rotor blade tips of the rotating rotor blades while the measurement is carried out.

In order to achieve the object stated in the introduction, the present invention further provides a separation measurement device which is in particular suited for carrying out the method according to the invention, with a tubular housing, a separation sensor which measures in contactless fashion and which is accommodated in the housing such that it can move axially between an operating position, wherein a tip of the sensor projects outward from the separation measurement device, and a withdrawn position, wherein the tip of the sensor is arranged within the separation measurement device, and an arresting device which is formed such that the separation sensor can be arrested at least in its operating position. By virtue of the movable arrangement of the separation sensor between the operational position and the withdrawn position, the separation sensor can be moved into the withdrawn position at any time and as required in order to protect it from external damage during transport or during insertion into an assigned through bore.

Preferably, the separation sensor is a confocal chromatic separation sensor or an acoustic separation sensor.

According to one configuration of the present invention, there is provided at least one spring which is arranged such that its spring force opposes a movement of the separation sensor from its withdrawn position into the operating position. In other words, the separation sensor is pressed by the spring into the withdrawn position, which ensures proper positioning of the separation sensor in the individual positions.

According to one variant of the invention, the separation sensor is arranged on a cylinder which is accommodated in movable fashion in the housing.

Preferably, the separation sensor is of rod-shaped design and is accommodated in an axial blind bore provided at the free end of the cylinder. This achieves a simple construction.

BRIEF DESCRIPTION OF THE DRAWINGS

Further features and advantages of the present invention will become clear from the following description of a separation measurement device according to one embodiment of the present invention, with reference to the appended drawing, in which.

DESCRIPTION OF AN EMBODIMENT

The figures show a separation measurement device 1, which measures in contactless fashion, according to one embodiment of the present invention or show its components. The separation measurement device 1 comprises, as principal components, a tubular housing 2, a bushing 3 which closes a first free end of the housing 2, a cap 4 which closes the second free end of the housing 2, a cylinder 5 which is accommodated in and is axially movable within the housing 2 and which is supported against the housing 2 via slide bushings 6, a separation sensor 7 which is attached to the cylinder 5 and extends through the bushing 3, and an arresting device 8 by means of which the cylinder 5 can be moved in the axial direction and can be arrested in various positions. The separation sensor 7 is, in the present case, a confocal chromatic separation sensor. Alternatively, however, an acoustic separation sensor or another separation sensor which measures in contactless fashion can also be used.

Figure 3:
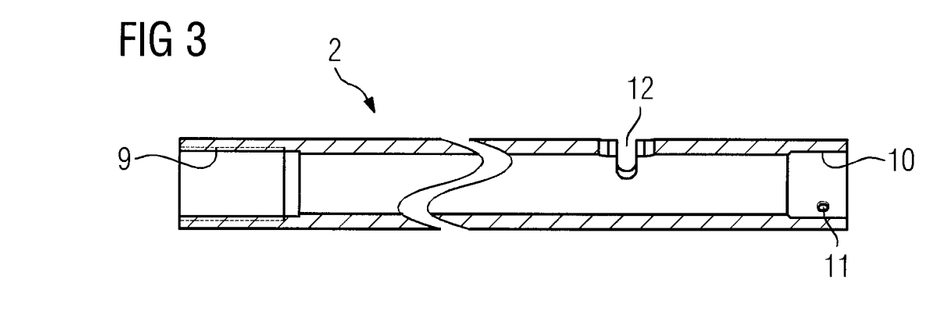
FIG. 3 is a section view of a housing of the separation measurement device shown in FIGS. 1 and 2.
Figure 4:
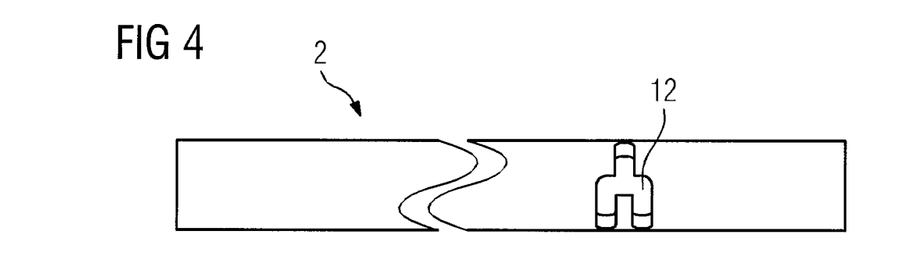
FIG. 4 is a plan view of the housing shown in FIG. 3.

In FIG. 3, the housing 2 is provided, at its first free end, with an internal thread 9 for the purpose of fixing the bushing 3. At the second free end of the housing 2, there is a securing section 10 for securing the cap 4. In the region of the securing section 10 there is a tapped bore 11 which extends radially through the wall of the housing 2 and serves for accommodating a grub screw (screw not shown in more detail). Furthermore, as shown in FIG. 4, the housing 2 is provided with a Y-shaped cutout 12 which forms one part of the arresting device 8.

Figure 5:
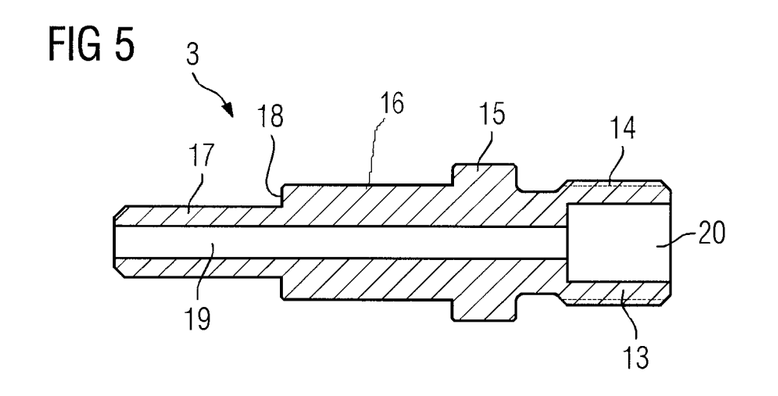
FIG. 5 is a section view of a bushing of the separation measurement device shown in FIGS. 1 and 2.

With reference to FIG. 5, the bushing 3 is essentially axisymmetric. It comprises, at its first free end, a securing section 13 which is provided with an external thread 14 that matches the internal thread 9 of the housing 2. The outer diameter of the bushing 3 narrows next to the securing section 13 and then transitions into an annular projection 15, which extends radially outward and serves as a stop. Adjoining the projection 15 is an intermediate section 16 with a first diameter and an end section 17 with a second smaller diameter, which sections are separated from one another by a step 18, wherein the first diameter is larger than the second diameter. A through bore 19 extends through the bushing 3 and serves for accommodating the free end of the separation sensor 7. Furthermore, in the region of the securing section 13, a spring accommodating space 20 in the form of a blind bore extending in the axial direction.

Figure 2:
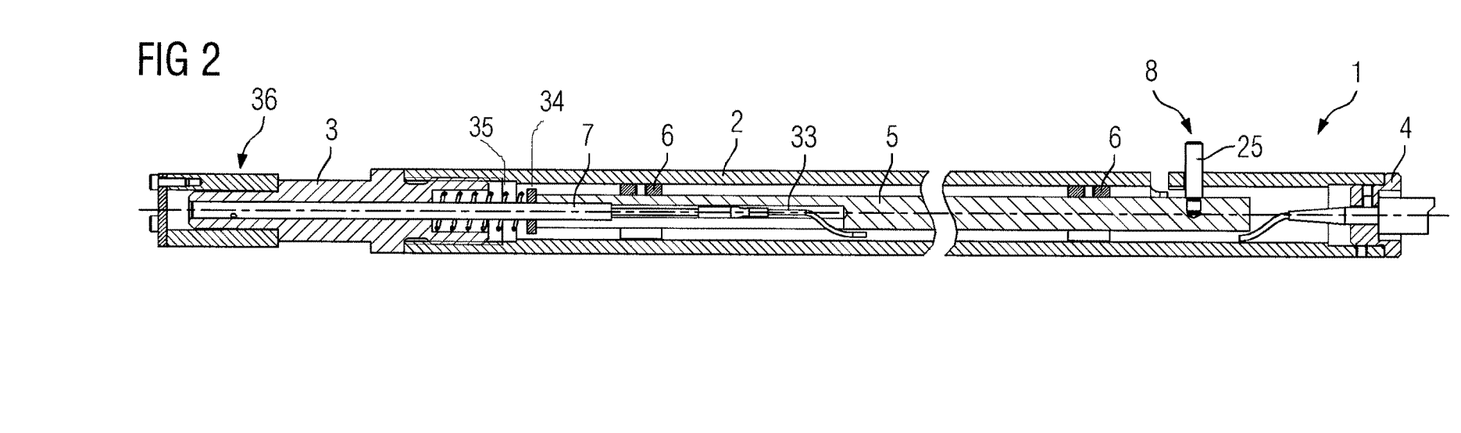
FIG. 2 is an enlarged section view of the separation measurement device shown in FIG. 1.
Figure 6:
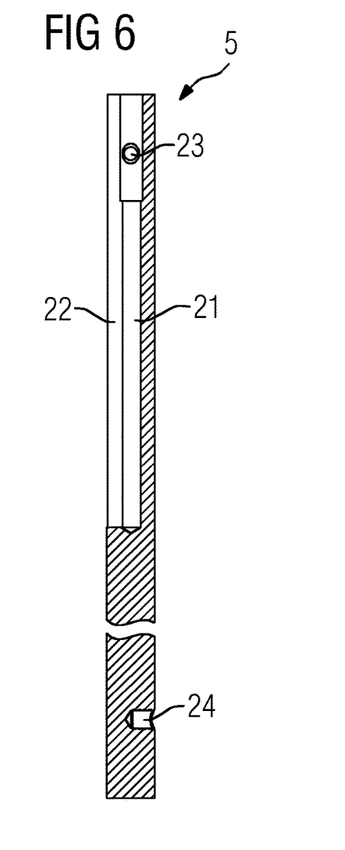
FIG. 6 is a section view of a cylinder of the separation measurement device shown in FIGS. 1 and 2.
Figure 7:
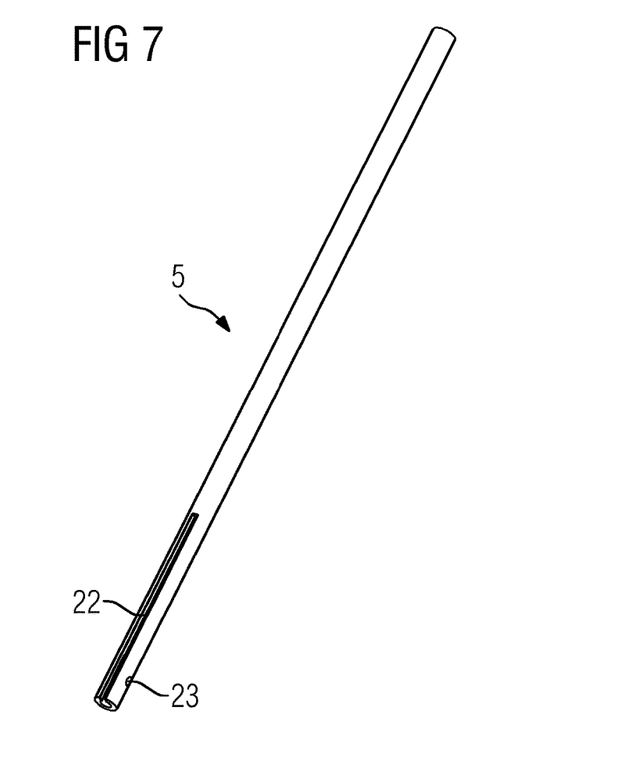
FIG. 7 is a perspective view of the cylinder shown in FIG. 6.

The cylinder 5, which is represented in detail in FIGS. 6 and 7, is produced from solid material and is provided, at its free end oriented toward the bushing 3, with a blind bore 21 that serves for accommodating the separation sensor 7. A slot 22 extends in the axial direction over the length of the blind bore 21. Furthermore, there is formed in the forward region of the blind bore 21 a tapped bore 23 which extends in the radial direction and serves for accommodating a grub screw. In FIGS. 2 and 6, a further tapped bore 24, which extends radially and serves for securing a threaded pin 25 that forms part of the arresting device 8, is formed at the other free end of the cylinder 5.

Figure 8:
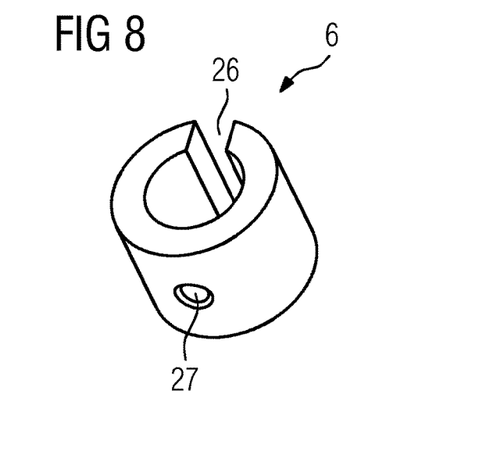
FIG. 8 is a perspective view of a slide bushing of the separation measurement device shown in FIGS. 1 and 2.

In FIGS. 2 and 8, the slide bushings 6 are essentially annular, wherein the respective internal diameter of the slide bushings 6 essentially matches the external diameter of the cylinder 5. The slide bushings 6 are provided with a slot 26 which extends axially and interrupts the annular shape. Furthermore, a tapped bore 27 which also serves for accommodating a grub screw is provided in the radial direction on each slide bushing 6.

Figure 9:
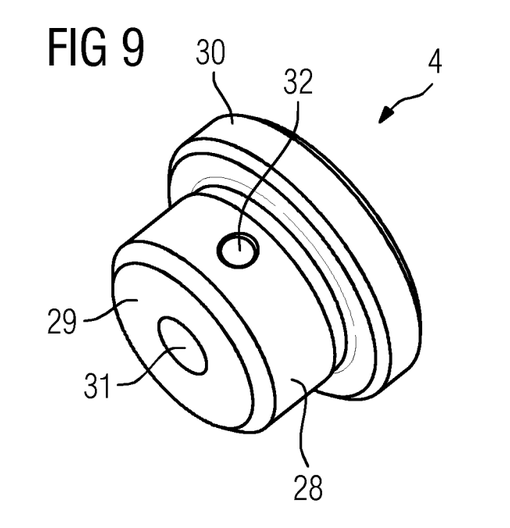
FIG. 9 is a perspective view of a cap of the separation measurement device shown in FIGS. 1 and 2.
Figure 10:
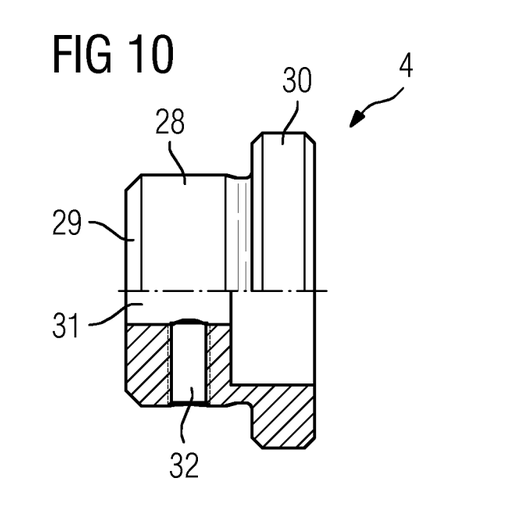
FIG. 10 is a partially sectional view of the cap shown in FIG. 9.

FIGS. 9 and 10 show the cap 4 which is also essentially axisymmetric. The cap 4 comprises a securing section 29 which is formed so as to match the securing section 10 of the housing 2 and which can be inserted into the latter with a clearance fit, and an annular projection 30 that extends radially and adjoins the securing section 29. The cap 4 is provided, centrally, with a through opening 31. In the region of the securing section 29, there is further formed a tapped bore 32 which extends radially as far as the through opening 31 and serves for accommodating a grub screw.

Assembling the separation measurement device 1 involves, in a first step, pushing the slide bushings 6 onto the external periphery of the cylinder 5, positioned at a distance from one another and secured on the cylinder 5 by means of grub screws. In a further step, that end of the separation sensor 7 which has wiring 33 is pushed into the blind bore 21 of the cylinder 5 and the wiring 33 is guided through the slot 22 of the cylinder 5. Then, a washer 34 and a spring 35 are pushed onto the free end of the separation sensor 7. In a further step, the cylinder 5 is pushed, together with the separation sensor 7, the washer 34 and the spring 35, into the housing 2 until the tapped bore 24 of the cylinder 5 lines up with the cutout 12 of the housing 2. Thereupon, the threaded pin 25 is guided through the cutout 12 of the housing 2 and is screwed into the tapped bore 24 of the cylinder 5. In a further step, the free end of the separation sensor 7 is pushed into the through bore 19 of the bushing 3. The bushing 3 is then screwed to the housing 2 until the projection 15 of the bushing 3 comes to bear against the housing 2, wherein the spring 35 is accommodated in the spring accommodating space 20 of the bushing 3. During the screwing procedure, the spring 35 is tensioned between the bushing 3 and the washer 34. In a further step, the securing section 29 of the cap 4 is inserted into the securing section 10 of the housing 2 with a clearance fit, the wiring 33 of the separation sensor 7 being fed through the through opening 31 of the cap 4 and secured by means of a grub screw inserted into the tapped bore 32. Thereupon, the cap 4 is secured on the housing 2, in that a grub screw is inserted through the tapped bore 11 of the housing 2.

In the assembled state, the cylinder with the separation sensor 7 arranged therein can be pushed axially within the housing 2, in that the threaded pin 25 of the arresting device 8 is actuated manually. More specifically, the separation sensor 7 can be moved axially between an operating position, wherein the tip of the separation sensor 7 projects outward from the bushing 3, a withdrawn position, wherein the tip of the separation sensor 7 is arranged within the bushing 3, and an intermediate position, and can be arrested in these positions.

Figure 1:
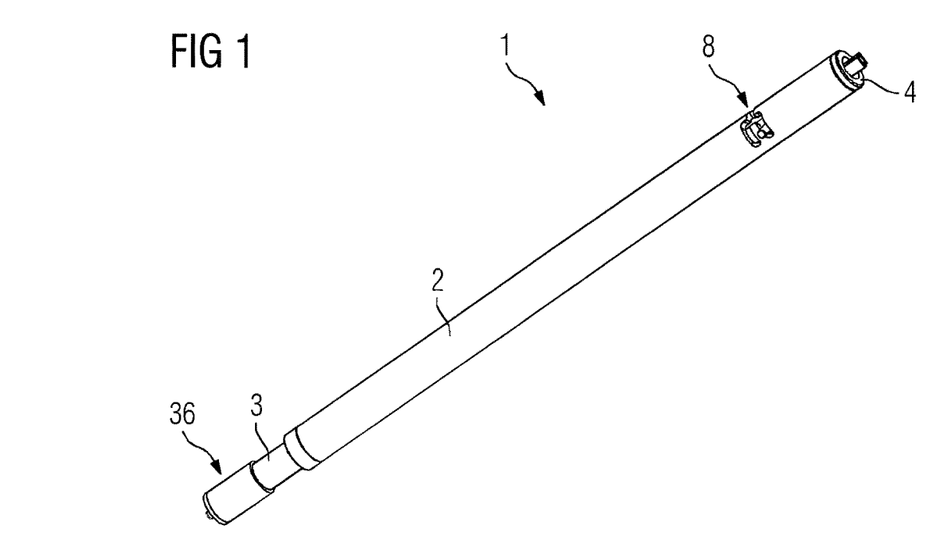
FIG. 1 is a perspective view of a separation measurement device according to one embodiment of the present invention.
Figure 11:
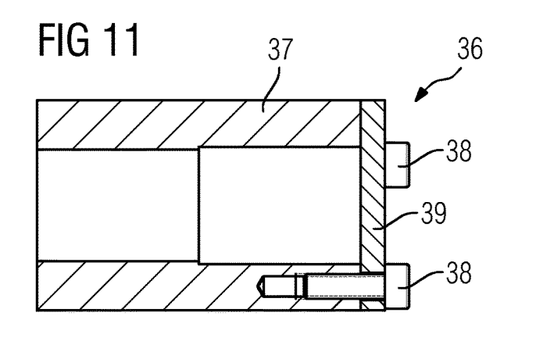
FIG. 11 is a sectional view of a calibration device of the separation measurement device shown in FIGS. 1 and 2.
Figure 12:
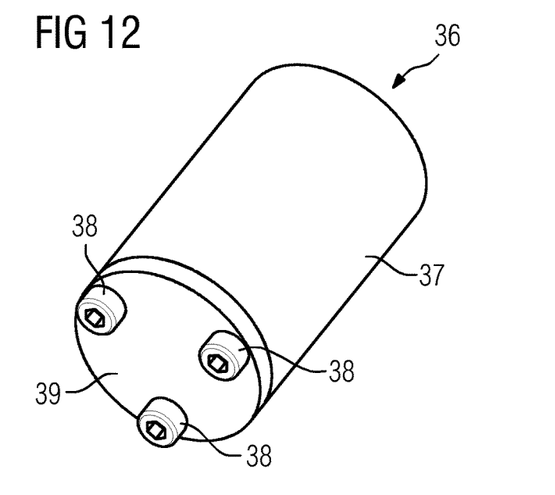
FIG. 12 is a perspective view of the calibration device of the separation measurement device shown in FIG. 11.

For the purpose of calibrating the separation measurement device 1, a calibration device 36 as shown in FIGS. 11 and 12 can be pushed with an exact fit onto the end section 17 of the bushing 3, as shown in FIGS. 1 and 2. The calibration device 36 comprises an axisymmetric sleeve 37, on which a cover 39 is secured on the end side by means of screws 38. The internal diameter of the sleeve 37 is formed in two stages, wherein the internal diameter at that free end of the sleeve 37 at which the cover 39 is arranged is slightly larger than the diameter at the other free end. Accordingly, the fit need be provided only at the free end of the sleeve 37.

Figure 13:
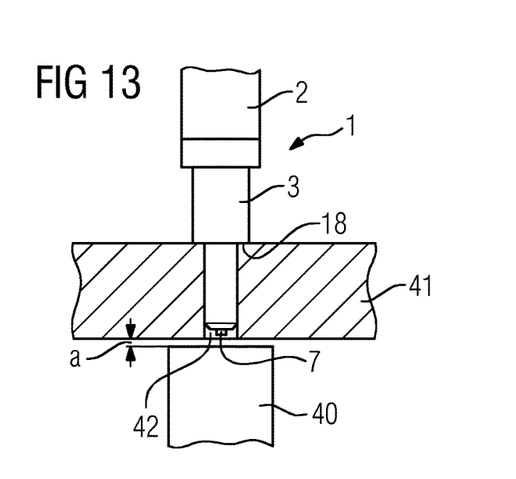
FIG. 13 is a view showing the separation measurement device shown in FIGS. 1 and 2 in a normally-arranged state.

FIG. 13 shows the separation measurement device 1 in the normal state during the measurement of a separation (a) between blade tips of rotor blades 40 held on a rotor and a casing 41 surrounding the rotor blade tips in annular fashion, which casing is formed in the present case by guide vane supports. In order to carry out such a measurement, the bushing 3 of the separation measurement device 1 is inserted into a through bore 42 which extends radially through the casing 41, is accessible from outside and is formed in the region of the rotor blades 40, until the step 18 comes to bear against the casing 41. In a further step, the separation sensor 7 is moved, by manual actuation of the arresting device 8, into its operating position such that the tip of the separation sensor 7 extends outward from the separation measurement device 1. The length of the end section 17 of the bushing 3 is chosen in that context such that the separation measurement device 1, including the tip of the separation sensor 7 which extends therefrom, does not extend in the normal state radially inward beyond the casing 41, such that the tip of the separation sensor 7 is protected from contact with the rotor blades 40. In a further step, the confocal chromatic separation sensor 7 is used to determine the separation (a) while the rotor is rotating. Advantageously, multiple through bores 42 are provided distributed over the circumference of the casing 41, such that the measurement of the separation (a) can be repeated at various circumferential positions, thus improving the precision of the detection of the relative position between the rotor blades 40 and the casing 41.

An essential advantage of the separation measurement device 1 represented in the figures lies in the fact that this device returns very precise measurement results by virtue of the use of a confocal chromatic separation sensor 7. Moreover, the separation sensor 7 operates in contactless fashion and is protected from contact with the rotor blades 40 while a measurement is carried out. By virtue of the movable arrangement of the separation sensor 7 between the operational position and the withdrawn position, the separation sensor 7 can be moved into the withdrawn position at any time and as required in order to protect it from external damage during transport or during insertion into an assigned through bore 42.

Although the invention has been described and illustrated in more detail by means of the preferred exemplary embodiment, the invention is not limited by the disclosed examples and other variations can be derived herefrom by a person skilled in the art without departing from the scope of protection of the invention.

The invention claimed is:

1. A method for measuring a separation between blade tips of rotor blades on a rotor and a casing annularly surrounding the rotor blade tips, and separated radially outward from the rotor blade tips when the rotor is rotating;

the method comprising:
measuring the separation in contactless fashion using at least one separation measurement device which measures in contactless fashion, the separation measurement device including a cylinder and an arresting device;
arresting movement of the cylinder in at least one position by moving a part of the arresting device toward the cylinder so that the part of the arresting device contacts the cylinder; and
releasing the cylinder from an arrested position by moving the part of the arresting device away from the cylinder so that the part of the arresting device does not contact the cylinder.

2. The method as claimed in claim 1 wherein:
the separation measurement device further includes a confocal chromatic separation sensor or an acoustic separation sensor.

3. The method as claimed in claim 1, further comprising:
inserting the separation measurement device into a through bore which extends radially through the casing and is accessible from outside for carrying out the separation measurement.

4. The method as claimed in claim 3, wherein:
the separation measurement device and the through bore are formed such that, in a normal state, the casing extends radially further inward than the separation measurement device accommodated in the through bore.

5. The method as claimed in claim 1, further comprising:
performing the separation measurement at a plurality of circumferential positions around the casing.

6. The method as claimed in claim 5, wherein the circumferential positions are evenly spaced apart from one another.

7. A separation measurement device for performing a method as claimed in claim 1, comprising:
a tubular housing; and
a separation sensor configured to measure in contactless fashion and which is accommodated in the housing at a location and in a manner such that the sensor is movable axially along an axis of the sensor between an operating position, wherein a tip of the separation sensor projects outward from the separation measurement device, and a withdrawn position, wherein the tip of the separation sensor is within the separation measurement device;
wherein the arresting device is configured such that the separation sensor can be arrested or held at least in its operating position.

8. The separation measurement device as claimed in claim 7, wherein the separation sensor is a confocal chromatic separation sensor or an acoustic separation sensor.

9. The separation measurement device as claimed in claim 7, further comprising:
   at least one spring arranged and configured such that its spring force opposes movement of the separation sensor from its withdrawn position into its operating position.

10. The separation measurement device as claimed in claim 7, wherein:
   the cylinder is accommodated in a longitudinally movable fashion in the housing and the separation sensor is arranged in the cylinder.

11. The separation measurement device as claimed in claim 10,
   wherein the separation sensor has a rod-shape; and
   an axial blind bore is provided at the free end of the cylinder in which the rod shaped sensor is arranged.

* * * * *